United States Patent [19]
Dickerson et al.

[11] Patent Number: 5,425,308
[45] Date of Patent: Jun. 20, 1995

[54] APPARATUS AND METHOD FOR SLICING POTATOES AND WASHING OR COATING POTATO SLICES

[75] Inventors: Michael Dickerson, Arlington; Wilfred M. Bourg, Jr., Pantego; Kevin C. Cogan, Carrollton; Donald V. Neel, Highland Village; David B. Emerson, Coppell; Pravin Desai, Carrollton, all of Tex.

[73] Assignee: Recot, Inc., Plano, Tex.

[21] Appl. No.: 191,043

[22] Filed: Feb. 2, 1994

[51] Int. Cl.$^6$ ............................................. A23N 15/00
[52] U.S. Cl. ......................................... 99/536; 99/516; 99/537; 426/506; 15/3.12; 15/302; 134/63
[58] Field of Search .................... 99/537, 536, 516; 134/63; 426/506, 507, 508, 509; 15/3.11, 3.12, 3.13, 302

[56] References Cited
U.S. PATENT DOCUMENTS

| | | |
|---|---|---|
| 1,705,959 | 3/1929 | Byberg . |
| 2,091,675 | 8/1937 | Ferry ................................. 134/63 |
| 3,447,544 | 6/1969 | De Vergara . |
| 3,496,976 | 2/1970 | Nielsen . |
| 4,251,895 | 2/1981 | Caridis et al. ........................ 99/352 |
| 4,355,433 | 10/1982 | Dietrich . |
| 4,450,760 | 5/1984 | Wilson . |
| 4,549,478 | 10/1985 | Entes ................................... 99/536 |
| 4,962,777 | 10/1990 | Bell . |
| 4,980,187 | 12/1990 | Johnson . |
| 5,085,137 | 2/1992 | Mottur et al. ........................ 99/404 |

Primary Examiner—David A. Scherbel
Assistant Examiner—Reginald L. Alexander
Attorney, Agent, or Firm—Rothwell, Figg, Ernst & Kurz

[57] ABSTRACT

Apparatus and method for slicing potatoes and washing or coating the potato slices wherein the slices exit a slicing mechanism and are directed between inner and outer spray rings that generate a pressurized water mist which washes the slices. The nozzles in the inner spray ring face the nozzles in the outer ring so that the pressurized water mist is formed in a predetermined area located between the rings. The high pressure water mist removes surface starch from the slices, and vibrating sieve arrangements disposed downstream of the slicing apparatus cooperate with a series of spray bars to further clean the slices. The apparatus of the invention is also used in a method of coating potato slices with a treating material.

27 Claims, 4 Drawing Sheets

APPARATUS AND METHOD FOR SLICING POTATOES AND WASHING OR COATING POTATO SLICES

BACKGROUND OF THE INVENTION

1. Field of the Invention

The present invention relates generally to apparatus and methods for preparing sliced produce products and, more specifically, to an apparatus and method for slicing potatoes and washing or coating potato slices.

2. Description of Relevant Art

Various food products are prepared from produce such as potatoes, and many such products are prepared by slicing the produce, e.g., potato chips and other snack food products. It is generally known in the art to slice potatoes and then wash the slices to remove surface starch, potato scraps, foreign matter, etc., therefrom. The slices are typically washed by being immersed in a tank or drum of water with the slices and water being agitated by suitable means. See, e.g., U.S. Pat. No. 4,251,895 to Caridis et al. and U.S. Pat. No. 2,091,675 to Ferry. The patent to Caridis et al. teaches spraying the potato slices with water after washing them in a water tank. After being washed, the potato slices are carried by known conveyors which drain the water therefrom and transport the slices to a further processing station, e.g., an oven or fryer.

There are several drawbacks to prior art methods in which potato slices are washed in a tank or drum of water to remove starch or particles from the slices. First, the water contained in the washing tank must be kept relatively clean because the potato slices are washed by being soaked therein. This results in fairly complicated and costly pump systems for circulating water from a supply to the washing tank and for removing the starch and scraps from the used water, as well as significant costs due to the large amount of water required by these systems. Further, only a limited amount of control can be exercised over the washing of the slices due to the nature of the process, i.e., dumping a large quantity of product into a washing tank. In fact, inadequate cleaning of the slices may occur even when copious amounts of water are used for soaking and washing the slices. This can lead to several problems, such as starch build up in the cooking fryers which results in system down time needed to clean the fryers.

It is also known in the art to use spray nozzles for spraying water onto potato slices in order to remove starch and scraps. U.S. Pat. No. 4,549,478 to Entes discloses an apparatus for washing potato slices in which the potatoes are sliced and washed in a prowashing unit. The prowashing unit includes the slicer mechanism which receives and slices whole potatoes. A spray tube is disposed within the prowashing unit and has outlets directed at the knives of the slicer mechanism for washing and separating the slices. The slices exit the prowashing unit and enter an elongated rotatable washing tube in which the slices are washed by agitation. The slices then pass over conveyors to drain the remaining water and separate the potato scraps from the slices.

The Entes system cleans the slices by the rotating washing action in the washing tube. The water used to spray the knives of the slicer passes from the prewashing unit into the washing tube along with the potato slices. Thus, the starch-laden water is used in the washing tube after being used in the prewashing unit. The slices exit the washing tube onto a vibrating sieve arrangement which removes surface water from the slices. A rewashing unit is positioned downstream of the washing tube and includes sprayers which remove shreds or scraps present on the slices. The slices then pass over another sieve arrangement so that they are delivered to the next processing station in a dry condition.

The Entes slice washing system suffers from several drawbacks similar to the prior art systems mentioned above. For example, the spray tube of Entes is positioned within the upper portion of the prewashing unit and sprays water at the knives or blades of the slicer mechanism. Thus, the potato slices that are discharged downward from the slicer may not be sufficiently contacted and cleaned by the water dispensed from the spray tube which apparently is located above the blades. Furthermore, the single spray tube shown by Entes would spray water against limited surface area of the slices as they exit the slicer. The limited washing of the slices in the prewashing unit presumably necessitates use of the washing tube.

Also, the washing tube of Entes likely requires a relatively large amount of water to effect the disclosed rotating washing action of the slices (since the water is collected in a receiving tank and discharged). As discussed above, in apparatus such as the Entes apparatus the water must be kept relatively clean because the slices are washed by being soaked and moved therein.

Accordingly, there is a need in the art for an apparatus and method for slicing potatoes and washing the potato slices that are free of the problems present in prior art systems.

SUMMARY OF THE INVENTION

The present invention provides an apparatus and method for slicing potatoes and washing the potato slices. The apparatus according to the present invention includes a unique slicing mechanism having a potato slicer for receiving whole potatoes and slicing same into uniform potato slices, and a spray ring or rings with outlets positioned below the slicer's cutting blades for spraying water against the potato slices discharged from the slicer.

In a preferred embodiment, first and second spray rings are provided beneath the potato slicer. The spray rings each have outlets or nozzles, with the nozzles of one spray ring facing the nozzles of the other spray ring to form a pressurized water mist in a predetermined area through which the potato slices are directed after leaving the potato slicer. As the slices pass between the spray rings and through the water mist, the high pressure spray contacts the surfaces of the slices to forcibly remove surface starch and any foreign matter or debris.

The benefits provided by the present invention over prior art systems include decreased overall water usage since there is no water tank or drum that requires a large amount of water. Further, the present invention permits precise control over the washing of the slices by varying factors such as the spray ring nozzle size and the rate, pressure and direction of the water sprayed by the nozzles. In addition, the present invention preferably includes means for directing the slices into the predetermined area containing the pressurized water mist. Such means can be in the form of shroud members that force the potato slices exiting the slicer mechanism into the pressurized water mist.

Moreover, with the present invention it is not necessary to maintain the water dispensed by the spray rings particularly clean, i.e., as clean as the water used in prior art washing tanks or drums. This is due to the fact that the present invention utilizes a high pressure water mist to remove surface starch from the potato slices, as opposed to soaking or washing the slices in a tank of water. In other words, the spray rings dispense high pressure water which essentially blasts surface starch from the potato slices, in contrast to passing the slices through a water tank or the like until the starch is soaked into solution. While it is preferable to at least partially filter the used water to remove scraps or the like, the water does not need to be filtered and cleaned as in prior art systems.

The method of preparing and cleaning potato slices according to the present invention includes steps of passing potatoes into the potato slicer, directing the potato slices from the exit of the slicer into the pressurized water mist formed by the spray rings to remove surface starch from the slices, conveying the slices to drain water and separate potato scraps from the slices, and then spraying the slices with additional water to remove possibly remaining starch or scraps. A potato slicing and washing system includes various stations at which the aforementioned steps are performed.

In another aspect of the present invention, the apparatus is used in a method of coating the produce or potato slices with a pressurized mist of a chemical preservative, additive, etc., as opposed to or in addition to washing the slices.

In yet another aspect of the present invention, the apparatus is used in a blanching process wherein the potato slices are exposed to hot water so as to gelatinize the starch. Blanching of potato slices, which is generally known in the art, can be carried out with the present apparatus in an easy manner compared with prior art systems.

BRIEF DESCRIPTION OF THE DRAWINGS

Other features and advantages of the present invention will become apparent from the following description of preferred embodiments taken in conjunction with the accompanying drawings wherein.

DETAILED DESCRIPTION OF PREFERRED EMBODIMENTS

Figure 1:
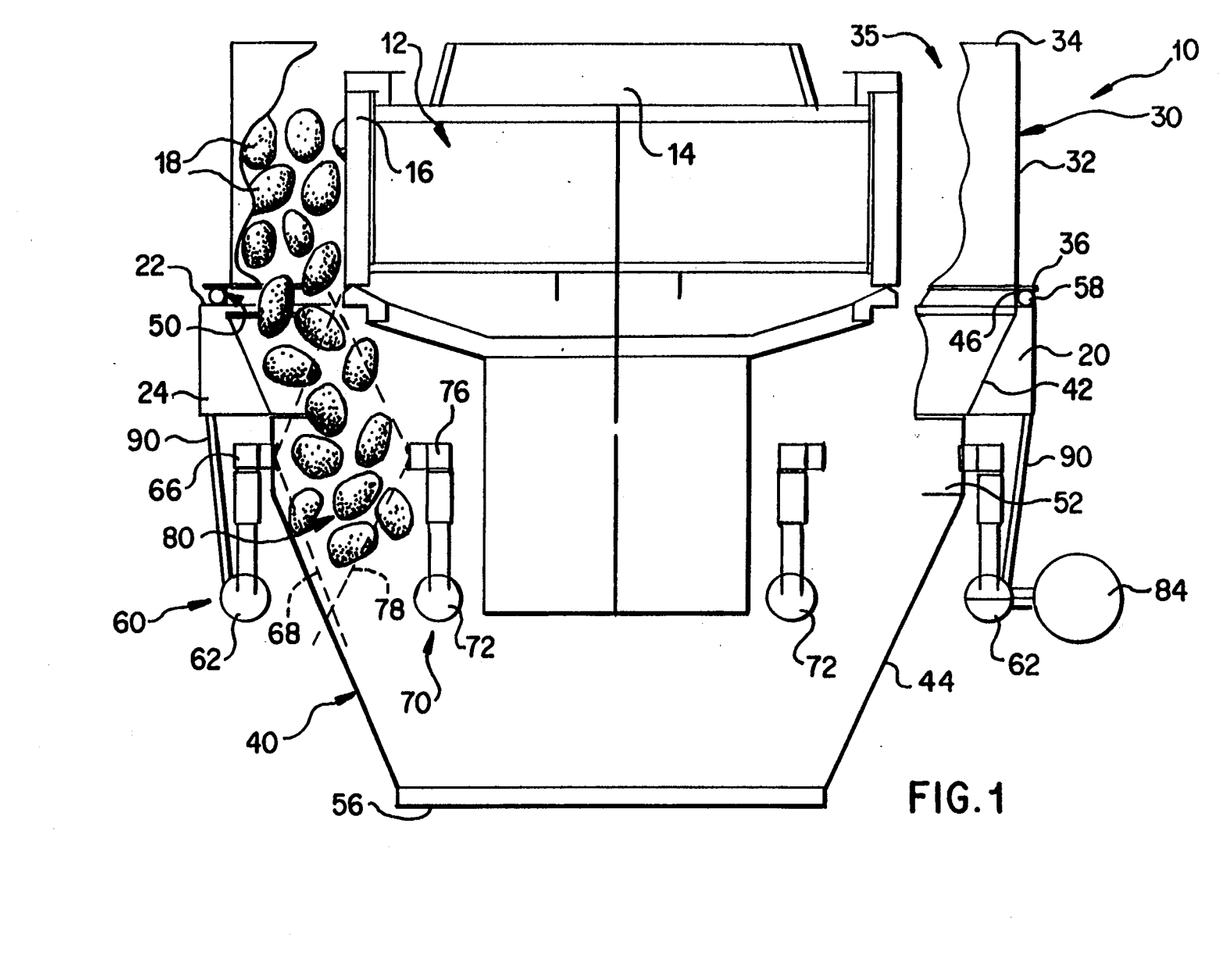
FIG. 1 is an elevational view, somewhat schematic, of a slicing and washing apparatus according to the present invention.

With reference to FIG. 1, an apparatus for slicing and washing potatoes is indicated generally by the reference numeral 10. According to the present invention, the apparatus 10 has a potato slicer 12 and a spray ring structure for washing the potato slices. It will, of course, be recognized that the apparatus and method of the present invention may be used to slice and wash various types of produce. However, for sake of explanation the present invention will be described as used in the preparation of potato slices.

The potato slicer can be in the form of a conventional rotary slicer 12, known in the art as an "Urschel" slicer. The structure and operation of such rotary-type slicers are known in the art and are disclosed in, for example, U.S. Pat. No. 4,604,925, assigned to the assignee of the present application, the subject matter of which patent is incorporated herein by reference.

As seen in FIG. 1, the potato slicer 12 includes an inlet 14 for receiving potatoes and an outlet 16. As will be described below, an upper shroud member 30 with a central aperture 35 is positioned over the inlet 14 of the slicer 12. The potato slices 18 are thrown outwardly from the potato slicer 12 toward the upper shroud 30 as shown in FIG. 1.

Attached to or positioned around the potato slicer 12 is a support member 20. Support member 20 serves to secure the spray rings 60, 70 of a potato slice washer which wash potato slices 18, as will be described below. The support member 20 also serves to support upper and lower shroud members 30, 40 as described below.

Figure 2:
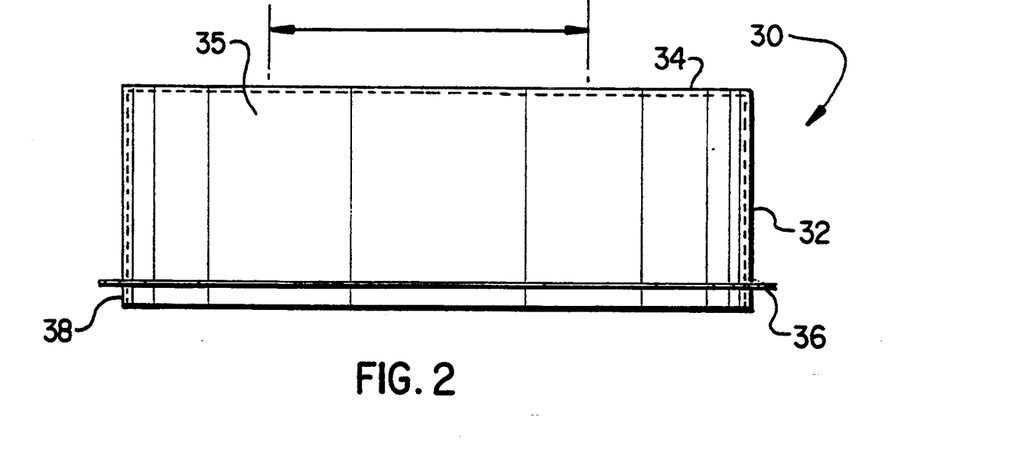
FIG. 2 is an elevational view of the upper shroud member which forms part of the embodiment of the present invention shown in FIG. 1.

The present invention includes upper and lower shroud members 30, 40 for directing the potato slices 18 from the slicer exit 16 toward spray rings 60, 70 so that the pressurized water mist dispensed by the spray rings impinges on the slices to remove starch or other matter from substantially all surfaces of the slices 18. The upper shroud 30 and lower shroud 40 are positioned so as force the potato slices 18 toward the spray rings 60, 70. As best seen in FIG. 2, upper shroud 30 has a side wall 32, an upper surface 34 with a central opening 35, a flange 36, and an extension 38 for engaging the lower shroud 40 as explained below.

Figure 3:
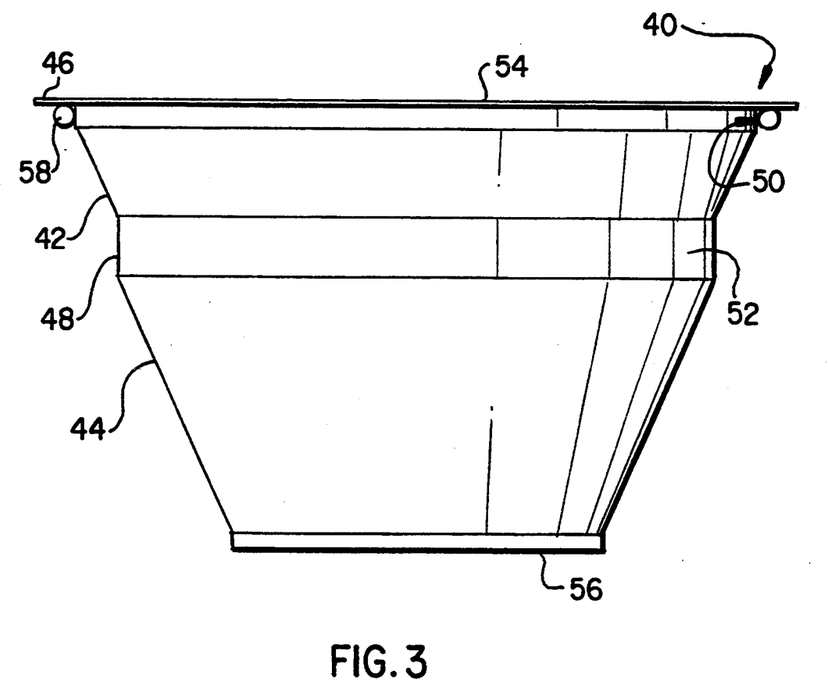
FIG. 3 is an elevational view of the lower shroud member which forms part of the embodiment of the present invention shown in FIG. 1.
Figure 4:
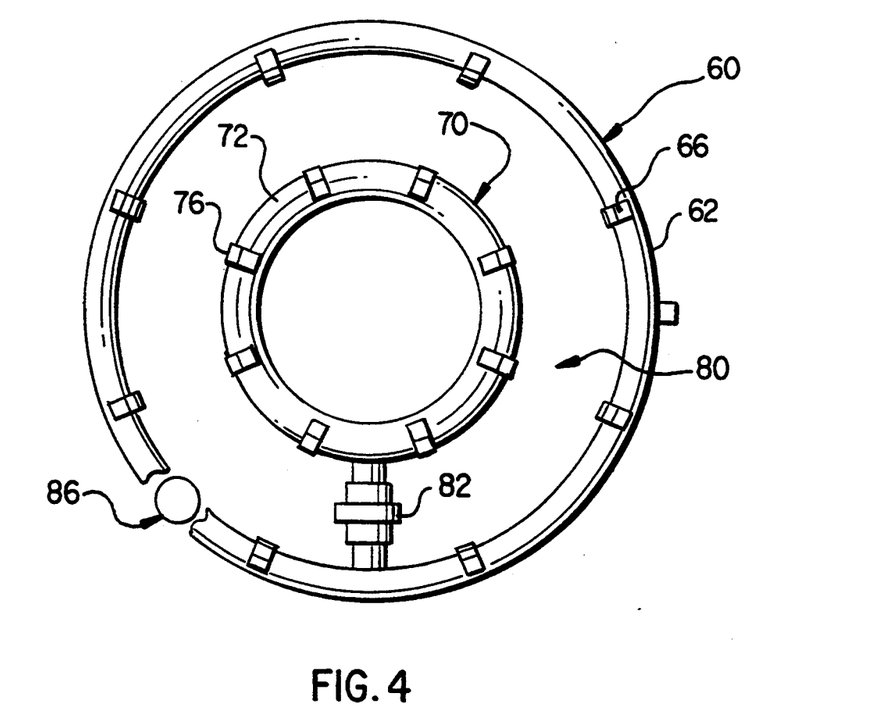
FIG. 4 is a plan view of the inner and outer spray rings which form part of the embodiment of the present invention shown in FIG. 1.

Lower shroud 40 is preferably funnel-shaped and includes an inlet 54 and an outlet 56. See FIG. 3. Shroud 40 has an upper slanted side wall portion 42 and a lower slanted side wall portion 44 joined by a first straight side wall portion 48. A second straight side wall portion 50 extends upwardly from slanted side wall portion 42, and a flange 46 extends outwardly from side wall portion 50. As seen in FIG. 4, a bar member 58 preferably is secured to the lower shroud 40 between flange 46 and straight side wall 50 thereof by, e.g., a welded connection. The bar member 58 seats on upper surface 22 of support member 20, as best seen in FIG. 1, so as to properly position the upper and lower shroud members 30, 40 with respect to the apparatus 10.

The upper shroud 30 has an extension 38 which is received in a close fit within the straight side wall 50 of lower shroud 40 (FIG. 1). The extension 38 of upper shroud 30 fits snugly within the lower shroud 40 with flange 36 of the upper shroud resting on flange 46 of the lower shroud. The close fit ensures that the upper shroud 30 is properly positioned relative apparatus 10 such that potato slices 18 contact the side wall 32 of shroud 30 and are directed downward (as seen in FIG. 1). As will be described in detail below, the slices pass downward into the upper portion of the lower shroud 40 and into the pressurized spray mist generated by spray rings 60, 70 which mist removes surface starch and scraps from the slices.

According to the present invention, spraying elements for spraying a pressurized water mist onto the potato slices 18 are provided in the slicing and washing apparatus 10. The spraying elements may be in the form of spray rings 60, 70 which have nozzles 66, 76, respectively. See FIGS. 1, 5 and 6. It will be recognized by those skilled in the art that the spray rings 60, 70 are but one example of a suitable potato slice washer for spraying a pressurized water mist onto the potato slices as they exit the slicer. For example, a different number of spray rings may be used. Further, the spray rings may be shaped in various ways, e.g., circular or noncircular.

While it is possible to utilize a single spray ring in the present invention, a preferred embodiment includes two concentric spray rings 60, 70 arranged so that the nozzles of one ring face the nozzles of the other ring. See FIG. 5. First or outer spray ring 60 preferably is circular in plan view and includes a spray tube 62 and a plurality of nozzles 66. The nozzles 66 are connected to tube 62 at spaced locations by suitable piping or a coupling 64. While it is possible to use various types of nozzles with spray ring 60, a preferred embodiment of the present invention utilizes nozzles commercially available from Spray Systems Inc. (and identified as model no. 1/8GGA4.3SS). Nozzles 66 dispense the water in a high pressure, conically or fan-shaped mist 68 as seen in FIG. 1. While in the preferred embodiment of the present invention the spray rings are circular in plan view, it must be recognized that the term ring is for explanatory and exemplary purposes only. Thus, for example, spray rings that are rectangular or triangular when viewed in plan could also be used in practicing the present invention.

Figure 5:
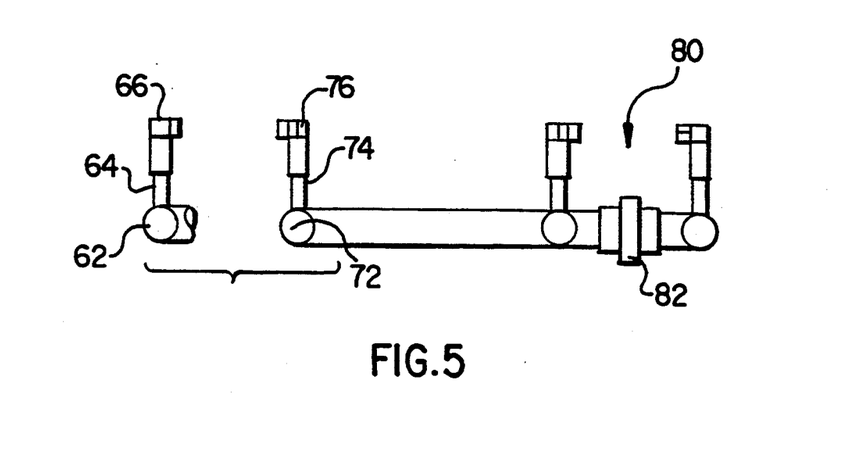
FIG. 5 is a front elevational view of the spray rings shown in FIG. 4 with portions broken away for clarity.

Outer spray ring 60 is secured to the potato slicing and washing apparatus 10 by connecting bars 90, which bars have one end attached to the spray tube 62 and the other end attached to the lower portion 24 of support member 20 described above. Any suitable number of bars 90 may be used to secure the spray rings 60, 70 to the apparatus 10. The bars 90 can be spaced at desired intervals around the periphery of the spray ring 60. As seen in FIGS. 4 and 5, second or inner spray ring 70 is connected to the outer spray ring 60 by a suitable pipe union or coupling 82. Therefore, connecting bars 90 effectively secure both spray rings 60, 70 to the slicer mechanism of the slicing and washing apparatus 10.

Inner spray ring 70 is also preferably circular when viewed in plan and includes a spray tube 72 and nozzles 76 which nozzles dispense a pressurized water spray pattern indicated at 78 in FIG. 1. The nozzles 76 used with spray ring 70 can be the same as or different from the nozzles 66 used with spray ring 60. Preferably, the nozzles 76 are the same as nozzles 66. It is important that the nozzles used in each spray ring be capable of dispensing a high pressure water mist which effectively blasts surface starch, foreign material, etc., from potato slices 18.

Directing the reader's attention back to FIG. 1, the nozzles 66 of outer spray ring 60 preferably face directly opposite nozzles 76 of inner spray ring 70. The respective nozzles define a predetermined spray area or field 80 through which the potato slices 18 are directed upon exiting the potato slicer 12. As the potato slices 18 are directed through the spray area 80, the high pressure water mist contacts the surfaces of the slices 18 and forcibly removes surface starch and potato scraps therefrom. Because the high pressure water mist is generated from oppositely directed nozzles, the resulting spray field permits water to contact substantially all surfaces of potato slices 18. Those skilled in the art will recognize that factors such as the water pressure, the size, shape and type of nozzle, the disposition of the nozzles on the spray rings, etc., can be varied to obtain desired spray areas or fields for particular products or applications. In addition, suitable control valves and pumps may be used to selectively regulate or adjust the pressure of the water fed to the spray rings. A pressure gage 84 is preferably mounted on tube 62 of outer spray ring 60 to indicate the water pressure therein.

The lower shroud 40 preferably includes openings for permitting the water dispensed by outer spray ring nozzles 66 to pass through the shroud and into the predetermined spray area 80. For example, openings 52 may be formed in first straight side wall portion 48 of lower shroud 40. As seen in FIG. 1, nozzles 76 spray water through openings 52 and onto potato slices 18 passing through spray area 80. The water contacts the slices 18 from many directions to blast surface starch off of the slices.

FIG. 4 depicts the spray rings 60, 70 in plan and shows coupling 82, which connects the rings 60, 70 together, and water inlet pipe 86. Outer spray ring 60 receives water from inlet 86 and the water passes through spray tube 62 into nozzles 66, as well as inner spray ring 70 and nozzles 76 (via coupling 82). FIG. 4 shows eight nozzles spaced around the periphery of each spray ring 60, 70, but it will be recognized by those skilled in the art that more or less than eight nozzles can be used. It is important, however, that the nozzles of the first spray ring at least partially face the nozzles of the second spray ring so as to form a predetermined spray area or field. Thus, while it is not necessary that the respective nozzles be positioned directly opposite each other, the potato slices should pass through the pressurized water mist such that the water contacts the slices from different directions. In a preferred embodiment, a pair of oppositely directed spray nozzles is disposed below each blade station of the rotary slicer head.

Figure 6:
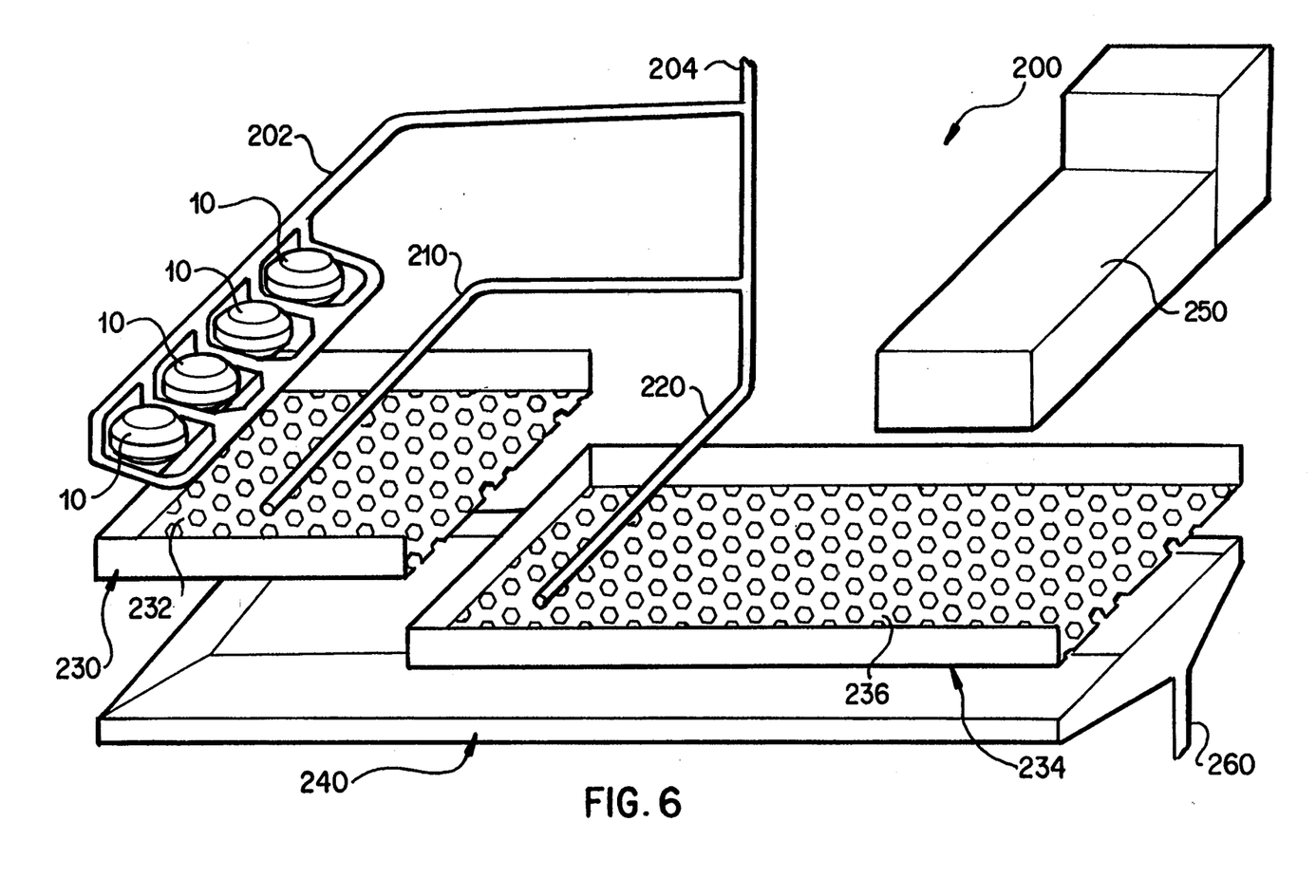
FIG. 6 is a perspective view of a slice washing system depicting the various processing stages, one of which includes the slicing and washing apparatus of FIG. 1.

With reference to FIG. 6, a system for slicing produce such as potatoes is indicated generally by the numeral 200 and includes a plurality of potato slicing and washing apparatus 10 which correspond to the apparatus depicted in FIGS. 1-5. The method of slicing potatoes and washing potato slices basically follows the description of the respective elements depicted in FIG. 6. Water is fed through inlet 204 and passes through piping 202 into the spray rings 60, 70 (not shown in FIG. 6). A pump (not shown) may be used to boost the pressure of the water that is fed to the apparatus 10. As stated above, control valves (not shown) may be used as well to regulate the water fed to apparatus 10. As described above, the spray rings generate a pressurized water mist onto the potato slices exiting the potato slicer mechanism of each slicing and washing apparatus 10. The washed potato slices fall from each apparatus 10 onto a first vibrating sieve arrangement 230 which includes a perforated bottom 232 for draining water and separating scraps other material from the slices. The vibrating sieve 230 also conveys the potato slices downstream, i.e., to the right in FIG. 6, where the slices pass under a spray bar 210 which further washes the slices.

The potato slices are then conveyed onto a second vibrating sieve arrangement 234 which includes a perforated bottom 236 for additional water drainage. The slices are passed under a second spray bar 220 which washes any remaining surface starch from the slices.

The second sieve arrangement 234 conveys the potato slices under an air knife 250 for partially drying the slices as is known in the art. The washed dried potato slices are then conveyed to the next processing station (not shown) which often is a fryer or oven for cooking the slices. A catch pan 240 is provided below the first and second sieve arrangements 230, 234 to collect the water, scraps, impurities, etc., drained from the slices. This water is preferably suitably processed to remove the starch and other material so that the water can be used repeatedly to wash additional slices. However, as described above, the water does not require the extensive filtering and cleaning treatments typically used in the prior art systems. It is necessary only to remove from the water scraps or other material that may clog the spray outlets and block water flow therethrough. While the slicing and washing apparatus of the present invention provides improved cleaning of slices as compared to prior art systems, the additional spray bars 210, 220 are preferably used in combination with the slicing-/washing apparatus to substantially remove any remaining surface starch or the like from the slices.

A significant benefit provided by the present invention is the ability to wash potato slices with water that is not particularly clean (as compared to water used for soaking slices clean). The highly pressurized water mist generated by the nozzles of the spray rings cleans the potato slices by forcibly removing the surface starch, potato scraps, foreign material, etc., as opposed to prior art washing tanks or drums in which the slices are soaked in moving water. As such, the present invention permits use of the same water to wash a relatively large amount of potato slices without having to extensively clean or filter the water. As long as the nozzles remain clear, the apparatus will spray the water mist onto the slices. This results in decreased overall water usage compared to prior art systems.

Furthermore, the present invention permits precise control over the potato slice washing process because of the ability to control the pressurized water mist generated by the nozzles. For example, the type of nozzle can vary and the pressure, velocity, etc., of the water flowing to the spray rings may be controlled by pumps, control valves, etc. The spray pattern emitted from the nozzles can be selected based on specific applications and/or products. Thus, the slicing and washing apparatus of the present invention can be used for many products other than potatoes and under a wide range of conditions.

It is apparent that the present invention provides an apparatus and method for slicing produce, such as potatoes, and washing the resultant potato slices in a manner which greatly improves upon the prior art, results in less water usage, and permits more controlled washing of the slices.

In another embodiment of the present invention, the slicing and washing apparatus is used in a method of slicing produce, such as potatoes, and spraying the slices with a material to coat substantially all surfaces of the slices as they pass through the predetermined spray area 80. The coating material may comprise any of various known treating materials, e.g., chemical preservatives such as bisulfite, additives, etc., typically used in the production of produce products.

In still another embodiment, the apparatus is used to blanch the potato slices by spraying a mist of hot water which gelatinizes the starch as the slices pass therethrough.

The foregoing description of preferred embodiments has been set forth for the purpose of a complete disclosure and does not limit the invention herein. Accordingly, various modifications, adaptations, and alternatives may occur to one skilled in the art without departing from the spirit and scope of the invention as defined by the appended claims.

I claim:

1. An apparatus for slicing potatoes and washing potato slices, the apparatus comprising:

a potato slicer for producing a plurality of individual potato slices, the potato slicer having an entrance for receiving potatoes and an exit for dispensing the plurality of potato slices;

a potato slice washer disposed adjacent to and below said potato slicer so as to direct pressurized water against the plurality of potato slices dispensed from the exit of the slicer in order to substantially remove surface starch from the slices, the potato slice washer including a plurality of spray outlets disposed below the slicer exit for generating a pressurized water mist below the slicer;

whereby the potato slices exit the slicer and pass through the pressurized water mist which substantially removes surface starch from the slices.

2. An apparatus as defined in claim 1, wherein said plurality of spray outlets are defined in a spray ring that is substantially a closed loop and is disposed beneath the exit of the potato slicer so that when water is directed through said spray outlets, the spray outlets direct a pressurized water mist onto the potato slices to substantially remove surface starch therefrom.

3. An apparatus as defined in claim 2, wherein said spray ring has a circular shape and the spray outlets are disposed around the periphery of the spray ring.

4. An apparatus as defined in claim 2, wherein said plurality of spray outlets include a plurality of high pressure nozzles for dispensing a pressurized water mist.

5. An apparatus as defined in claim 1, wherein said plurality of spray outlets are disposed in first and second spray rings configured to form the pressurized water mist substantially therebetween, and the potato slices are directed from the exit of the slicer into the pressurized water mist.

6. An apparatus as defined in claim 5, wherein the first and second spray rings are circular and concentric, and the spray outlets are spray nozzles disposed around the periphery of each of the first and second spray rings in oppositely directed pairs.

7. An apparatus for slicing potatoes and washing the resultant potato slices, the apparatus comprising:

a slicer for slicing potatoes into a plurality of potato slices;

a potato slice washer for washing the plurality of potato slices to substantially remove surface starch from the slices, said slice washer being disposed below said potato slicer and including a plurality of outlets for generating a pressurized water mist in a predetermined area, said water mist being sufficient to dislodge surface starch present on the potato slices, said predetermined area being located below said potato slicer; and a shroud member for directing potato slices from an exit of said potato slicer into said predetermined area so that the pressurized water mist contacts the potato slices and substantially dislodges surface starch therefrom.

8. An apparatus as defined in claim 7, wherein said potato slice washer includes at least one spray ring having a plurality of spray outlets that dispense pressurized water toward the predetermined area to wash potato slices discharged from the exit of the potato slicer.

9. An apparatus as defined in claim 8, wherein the spray ring is circular and the plurality of outlets cooperate to dispense a substantially cylindrically-shaped pressurized water mist.

10. An apparatus as defined in claim 7, wherein said potato slice washer includes first and second spaced spray rings each of which contains a plurality of spray outlets, and the predetermined area is located between the first and second spray rings.

11. An apparatus as defined in claim 10, wherein the spray outlets in the first spray ring are positioned so as to face the spray outlets in the second spray ring to form a pressurized water mist between said first and second spray rings.

12. An apparatus as defined in claim 11, wherein each spray ring is circular and includes high pressure nozzles adjacent said spray outlets which nozzles each dispense a substantially fan-shaped pressurized water mist.

13. An apparatus as defined in claim 7, wherein said shroud member is disposed adjacent an exit of the potato slicer and has at least one opening through which the pressurized water mist passes into said predetermined area.

14. A method for slicing potatoes and washing and removing scrap material from potato slices, the method comprising the steps of:
feeding potatoes into a potato slicer for producing a plurality of potato slices which are dispensed from an exit of the slicer;
providing potato slice washer including first and second spray rings which include a plurality of spray outlets, the spray rings being arranged such that the spray outlets of the first spray ring are directed toward the spray outlets of the second spray ring;
generating a pressurized water mist in an area located at least partially between the first and second spray rings;
directing the plurality of potato slices from the exit of the potato slicer into the area having a pressurized water mist generated therein; and
passing the plurality of potato slices through the pressurized water mist to wash the slices by forcibly removing surface starch from the potato slices.

15. The method according to claim 14, further comprising the step of passing the washed potato slices onto a first vibrating sieve conveyor and under a first spray bar for removing remaining surface starch from the slices, the first sieve serving to drain water and separate potato scraps from the slices.

16. The method according to claim 15, further comprising the step of passing the washed potato slices from the first vibrating sieve onto a second vibrating sieve, the second vibrating sieve having a second spray bar for removing remaining surface starch from the slices.

17. The method according to claim 16, further comprising the step of passing the washed potato slices along the second vibrating sieve and under an air knife for at least partially drying the slices.

18. The method according to claim 17, further comprising the step of feeding water from an inlet into said plurality of spray outlets and into said first and second spray bars.

19. The method according to claim 14, wherein the first and second spray rings being disposed below the slicer with the pressurized water mist formed between the first and second spray rings whereby the slices pass therethrough and are washed.

20. The method according to claim 14, wherein the potato slices are passed through a spray mist of heated water which blanches the slices to at least partially gelatinize the starch therein.

21. A method for slicing potatoes and coating potato slices with a treating material, the method comprising the steps of:
feeding potatoes into a potato slicer for producing a plurality of potato slices;
directing the plurality of potato slices downward from an exit of the potato slicer into an area having a pressurized mist of the treating material generated therein, the mist being generated by a plurality of spray outlets which are disposed below the exit of the slicer; and
passing the plurality of potato slices through the pressurized mist of treating material to coat a substantial surface area of the slices with the treating material.

22. The method according to claim 21, wherein the treating material is a preservative that is coated over the surfaces of the potato slices.

23. The method according to claim 21, wherein the plurality of potato slices are directed from an exit of the potato slicer through a pressurized mist of treating material generated by first and second spray rings, the first and second spray rings being disposed below the slicer with the pressurized mist of treating material formed between the first and second spray rings whereby the slices pass therethrough and are coated with said treating material.

24. A method for slicing potatoes and washing potato slices, the method comprising the steps of:
feeding potatoes into a potato slicer for producing a plurality of potato slices;
directing the plurality of potato slices from an exit of the potato slicer into an area having a pressurized water mist generated therein, the mist being generated by a plurality of spray outlets which are disposed adjacent to the exit of the slicer means;
passing the plurality of potato slices through the pressurized water mist to wash the slices by forcibly removing surface starch from the potato slices; and
wherein the plurality of potato slices are directed from an exit of the potato slicer through the pressurized water mist which is generated by first and second spray rings, the first and second spray rings being disposed below the slicer with the pressurized water mist formed between the first and second spray rings whereby the slices pass therethrough and are washed.

25. A method for slicing potatoes and washing potato slices, the method comprising the steps of:
feeding potatoes into a potato slicer for producing a plurality of potato slices;
directing the plurality of potato slices from an exit of the potato slicer into an area having a pressurized water mist generated therein, the mist being generated by a plurality of spray outlets which are disposed adjacent to the exit of the slicer means;
passing the plurality of potato slices through the pressurized water mist to wash the slices by forcibly removing surface starch from the potato slices; and wherein the potato slices are passed through a spray mist of heated water which blanches the slices to at least partially gelatinize the starch therein.

26. A method for slicing potatoes and coating potato slices with a treating material, the method comprising the steps of:

feeding potatoes into a potato slicer for producing a plurality of potato slices;

directing the plurality of potato slices downward from an exit of the potato slicer into an area having a pressurized mist of the treating material generated therein, the mist being generated by a plurality of spray outlets which are disposed below the exist of the slicer means;

passing the plurality of potato slices through the pressurized mist of treating material to coat a substantial surface area of the slices with the treating material; and wherein the treating material is a preservative that is coated over the surfaces of the potato slices.

27. An apparatus for slicing potatoes and washing potato slices, the apparatus comprising:

a potato slicer for producing a plurality of individual potato slices, the potato slicer having an entrance for receiving potatoes and an exit for dispensing the plurality of potato slices;

a potato slice washer disposed adjacent to said potato slicer so as to direct pressurized water against the plurality of potato slices dispensed from the slicer in order to substantially remove surface starch from the slices, the potato slice washer comprising a plurality of spray outlets for generating a pressurized water mist below the slicer; and wherein said plurality of spray outlets are disposed in first and second spray rings configured to form the pressurized water mist substantially therebetween, and the potato slices are directed from the exit of the slicer into the pressurized water mist;

whereby the potato slices pass through the pressurized water mist which substantially removes surface starch from the slices.

* * * * *